United States Patent
Chaupin

(10) Patent No.: US 9,435,474 B2
(45) Date of Patent: Sep. 6, 2016

(54) FLUID COMMUNICATION DEVICE HAVING A RING REDUCING MOUNTING STRESS

(71) Applicant: A. RAYMOND ET CIE, Grenoble (FR)

(72) Inventor: Jérôme Chaupin, Saint-Pierre d'Allevard (FR)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 14/403,623

(22) PCT Filed: Jul. 17, 2013

(86) PCT No.: PCT/EP2013/065103
§ 371 (c)(1),
(2) Date: Nov. 25, 2014

(87) PCT Pub. No.: WO2014/016184
PCT Pub. Date: Jan. 30, 2014

(65) Prior Publication Data
US 2015/0167879 A1    Jun. 18, 2015

(30) Foreign Application Priority Data

Jul. 23, 2012 (FR) .................................... 12 57124

(51) Int. Cl.
*F16L 37/084* (2006.01)
*F16L 37/12* (2006.01)
(Continued)

(52) U.S. Cl.
CPC ......... *F16L 37/1225* (2013.01); *F02M 55/004* (2013.01); *F16L 21/08* (2013.01); *F16L 37/084* (2013.01); *F02M 2200/853* (2013.01)

(58) Field of Classification Search
CPC ..... F16L 37/084; F16L 37/125; F16L 21/08; F02M 2200/853; F02M 55/004
USPC .................................................. 285/308, 305
See application file for complete search history.

(56) References Cited

U.S. PATENT DOCUMENTS

| 3,450,424 A | * | 6/1969 | Calisher | ................ F16L 37/088 |
| | | | | 285/305 |
| 5,725,257 A | * | 3/1998 | Sakane | ................. F16L 37/088 |
| | | | | 285/319 |

(Continued)

FOREIGN PATENT DOCUMENTS

| DE | WO 9015281 A1 * 12/1990 | ............ F16L 37/084 |
| DE | WO 03040607 A1 *  5/2003 | ........... F02M 55/002 |

(Continued)

OTHER PUBLICATIONS

International Search Report and Written Opinion dated Aug. 21, 2013 from related International Application No. PCT/EP2013/065103.

(Continued)

*Primary Examiner* — David E Bochna
(74) *Attorney, Agent, or Firm* — Faegre Baker Daniels LLP

(57) ABSTRACT

A fluid communication device including a tubular body which enables the circulation of a fluid and which has an end piece that is connectable to a plug-in pipe having an outer annular locking groove. An assembly head includes a receiving chamber in which an end piece of the tubular body is mounted. The assembly head includes a U-shaped locking element having two arms that are inserted into the receiving chamber. An intermediate ring is slidably mounted in the receiving chamber to achieve a pre-opening of the locking element just before the plug-in pipe reaches a position in which it engages with the end piece.

3 Claims, 6 Drawing Sheets

(51) Int. Cl.
*F02M 55/00* (2006.01)
*F16L 21/08* (2006.01)

(56) References Cited

U.S. PATENT DOCUMENTS

| | | | |
|---|---|---|---|
| 7,445,249 B2 | 11/2008 | Feger et al. | |
| 7,556,022 B1 * | 7/2009 | Doherty | F02M 55/004 123/456 |
| 7,571,939 B2 * | 8/2009 | Yoshida | F16L 37/088 285/308 |
| 7,631,904 B2 * | 12/2009 | Heim | F16L 37/088 285/305 |
| 7,950,699 B2 * | 5/2011 | Bauer | F16L 37/088 285/305 |
| 2007/0246937 A1 | 10/2007 | Feger et al. | |
| 2010/0090461 A1 | 4/2010 | Spielmann | |
| 2013/0249209 A1 * | 9/2013 | Netzer | F16L 25/009 285/81 |

FOREIGN PATENT DOCUMENTS

| | | | |
|---|---|---|---|
| EP | 2072800 A1 * | 6/2009 | F02M 55/004 |
| FR | EP 2101097 A1 * | 9/2009 | F16L 37/088 |
| FR | 2929679 A1 | 10/2009 | |

OTHER PUBLICATIONS

Office Action dated Aug. 28, 2015 in correspondence Chinese Application No. 201380036269.9.
Office Action dated Oct. 20, 2015 in correspondence Japanese Application No. 2015-521029.

* cited by examiner

FLUID COMMUNICATION DEVICE HAVING A RING REDUCING MOUNTING STRESS

CROSS-REFERENCE TO RELATED APPLICATIONS

This application is a U.S. National Phase Patent Application based on International Application No. PCT/EP2013/065103 filed Jul. 17, 2013, which claims priority to French Patent Application No. 1257124 filed Jul. 23, 2012, the entire disclosures of which are hereby explicitly incorporated by reference herein.

BACKGROUND OF THE INVENTION

1. Field of the Invention

The present invention relates to the field of fittings for fluid conveyance, and more specifically a fluid communication device comprising a tubular body permitting circulation of a fluid and having a tubular end piece extending in a given axial direction, said tubular end piece being intended to be connected by axial insertion to a plug-in pipe having an outer annular locking neck, said device further comprising an assembly head in which the tubular end piece is mounted, said assembly head comprising a receiving chamber that is coaxial with the tubular end piece and is adapted to receive said plug-in pipe so as to connect it to the tubular end piece, said assembly head also comprising a U-shaped locking element with two arms that insert into said receiving chamber in an insertion direction that is perpendicular to said axial direction, said two arms being adapted to spread apart elastically in said receiving chamber in a direction transverse to said axial direction when the pipe is displaced axially in the chamber to a position of abutment in which it is fully connected to the tubular end piece, said arms further being adapted to engage in said annular neck of the plug-in pipe by moving closer together when said plug-in pipe has reached its position of abutment with respect to the tubular end piece, so as to lock the plug-in pipe in position in the assembly head.

2. Description of the Related Art

This type of fluid communication device is widely used to quickly connect all types of fluid pipes to a flange, particularly in the automotive industry for the connection of fuel injectors, filters, and radiators. In some cases, the production of these flanges by machining may necessitate several rework operations, owing to the complexity of the flanges. To reduce the cost of their production, however, manufacturers of these flanges no longer do finishing work on the radii and chamfers of the pipes to be connected, and the latter consequently may damage the seals provided in the communication devices such as that defined above. There may also be damage to the locking element of the communication device if the insertion forces required to insert the pipe in the communication device are too high, due to binding or catching of the elements that are to be inserted one inside the other.

Published patent U.S. Pat. No. 7,445,249 describes a plug-in pipe with an annular rib that serves to pre-open a U-shaped locking element in a fluid communication device. As noted above, however, manufacturers of flanges with plug-in pipes are in fact trying to reduce the complexity of such pipes.

SUMMARY OF THE INVENTION

The present invention provides a fluid communication device designed with a mechanism for pre-opening a locking element.

To this end, the subject matter of the invention is a fluid communication device comprising a tubular body permitting circulation of a fluid and having a tubular end piece extending in a given axial direction, said tubular end piece being intended to be connected by axial insertion into a plug-in pipe having an outer annular locking neck, said device further comprising an assembly head in which the tubular end piece is mounted, said assembly head comprising a receiving chamber that is coaxial with the tubular end piece and is adapted to receive said plug-in pipe so as to connect it to the tubular end piece, said assembly head also comprising a U-shaped locking element with two arms that insert into said receiving chamber in an insertion direction that is perpendicular to said axial direction, said two arms being adapted to spread apart elastically in said receiving chamber in a direction transverse to said axial direction when the pipe is displaced axially in the chamber to a position of abutment in which it is fully connected to the tubular end piece, said arms further being adapted to engage in said annular neck of the plug-in pipe by moving closer together when said plug-in pipe has reached its position of abutment with respect to the tubular end piece, so as to lock the plug-in pipe in position in the assembly head, characterized in that further provided is an intermediate ring, which is mounted in said receiving chamber so as to able to slide in said axial direction in order to effect a pre-opening of the locking element, said intermediate ring being adapted to be pushed axially by said plug-in pipe when the latter is displaced in said receiving chamber toward the tubular end piece, said intermediate ring having chamfers that act to elastically spread apart the two arms of the locking element just before said plug-in pipe reaches its position of abutment.

The idea on which the invention is based is, therefore, to provide a sliding intermediate ring that accompanies the insertion of the pipe in the communication device all the way to its position of abutment on the tubular end piece, thereby reducing the stresses of mounting the pipe on the tubular end piece.

The fluid communication device according to the invention can advantageously have the following features:

it comprises an elastic biasing element mounted in said receiving chamber in such a way as to act in opposition to said axial displacement of the intermediate ring in order to return the latter to an initial position when the latter is not being pushed by a pipe said intermediate ring comprises reference tongues that are visually apparent from the outside of the assembly head when said pipe is locked on the tubular end piece.

In one form thereof, the present invention provides a fluid communication device including a tubular body permitting circulation of a fluid and having a tubular end piece extending in a given axial direction, the tubular end piece being intended to be connected by axial insertion into a plug-in pipe having an outer annular locking neck, the device further including an assembly head in which the tubular end piece is mounted, the assembly head including a receiving chamber that is coaxial with the tubular end piece and is adapted to receive the plug-in pipe so as to connect it to the tubular end piece, the assembly head also including a U-shaped locking element with two arms that insert into the receiving chamber in an insertion direction that is perpendicular to the axial direction, the two arms being adapted to spread apart elastically in the receiving chamber in a direction transverse to the axial direction when the pipe is displaced axially in the chamber to a position of abutment in which it is fully connected to the tubular end piece, the arms further being adapted to engage in the annular neck of the plug-in pipe by moving closer together when the plug-in pipe has reached its position of abutment with respect to the tubular end piece, so as to lock the plug-in pipe in position in the assembly head, characterized in that further provided is an intermediate ring, which is mounted in the receiving chamber so as to be able to slide in the axial direction in order to effect a pre-opening of the locking element, the intermediate ring being adapted to be pushed axially by the plug-in pipe when the latter is displaced in the receiving chamber toward the tubular end piece, the intermediate ring having chamfers that act to elastically spread apart the two arms of the locking element just before the plug-in pipe reaches its position of abutment.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
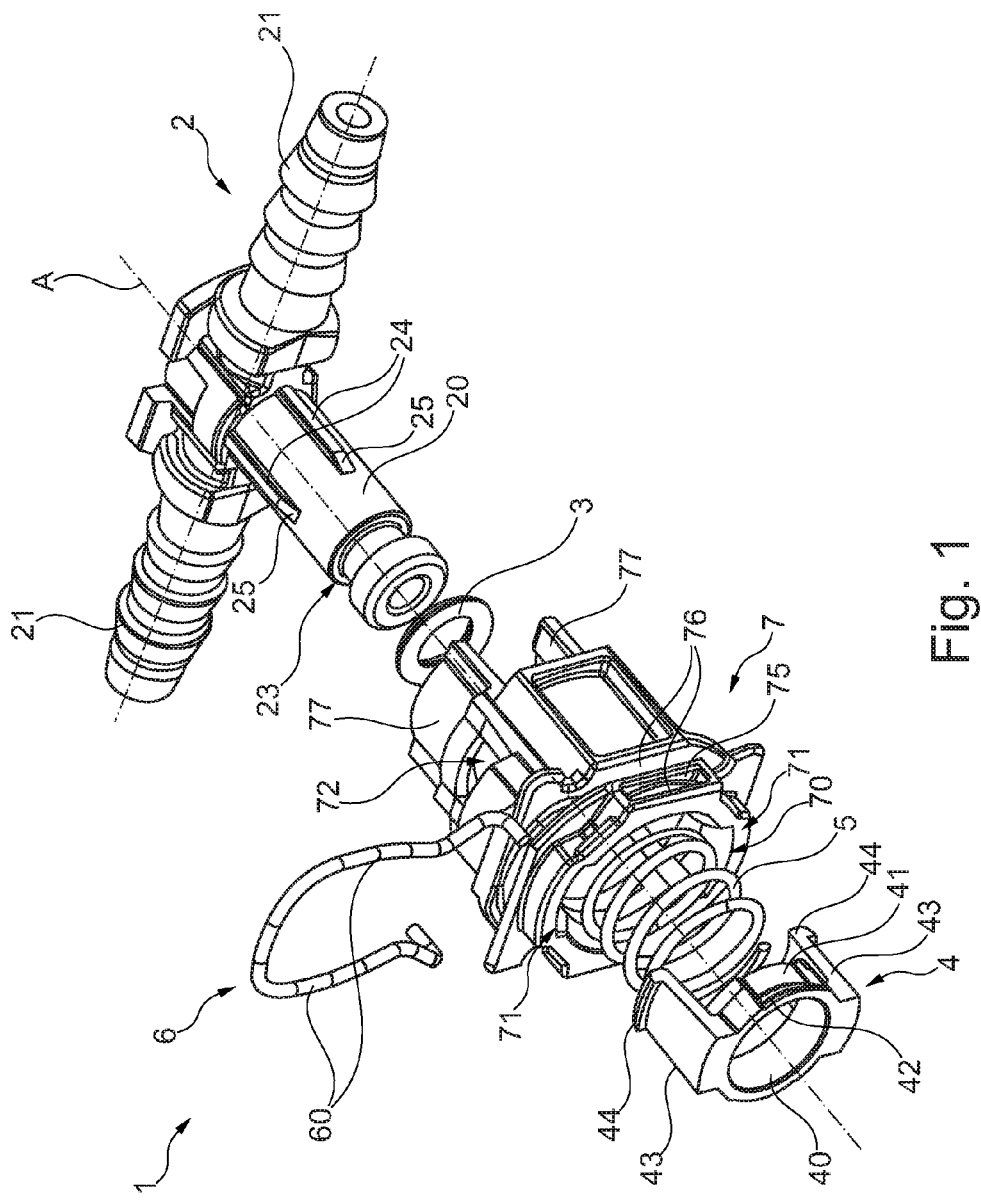
FIG. 1 is an exploded perspective view of the fluid communication device according to the invention.

Corresponding reference characters indicate corresponding parts throughout the several views. Although the exemplifications set out herein illustrate embodiments of the invention, the embodiments disclosed below are not intended to be exhaustive or to be construed as limiting the scope of the invention to the precise forms disclosed.

DETAILED DESCRIPTION

Turning now to the figures, particularly FIG. 1, the fluid communication device 1 according to the invention comprises a tubular body 2, seals 3, an intermediate ring 4, an elastic biasing element 5, locking means 6 and a hollow head forming a sleeve 7. The fluid communication device 1 is intended to receive a plug-in fluid pipe 8 (visible in FIGS. 4 to 11).

The body 2 has a tubular end piece 20 that extends in an axial direction A and, here, two stepped end pieces 21 with which the tubular end piece 20 forms a T. Passing axially through the tubular end piece 20 and the stepped end pieces 21 are pipes 22 that communicate with one another and that also form a T. The body 2 can, of course, have any other suitable shape. Thus, a fluid can circulate in the pipes 22 of the tubular end pieces 20 toward one or both of the stepped end pieces 22 and vice versa. The tubular end piece 20 is cylindrical overall and has an outer circular slot 23 provided toward its free end and intended to receive an annular gasket 3 that constitutes the sealing means after the fluid pipe 8 has been fitted onto the tubular end piece 20. The tubular end piece 20 additionally comprises longitudinal ribs 24, four of them in the example, which are distributed over the periphery of the tubular end piece 20 and whose function will be explained hereinbelow. These longitudinal ribs 24 extend over only a portion of the tubular end piece 20, opposite the free end of the tubular end piece 20. The ends of the longitudinal ribs 24 merge with the cylindrical portion of the tubular end piece 20 via inclined ramps 25 (visible in FIG. 1) whose function will be explained hereinbelow.

The intermediate ring 4 comprises a guide ring 40 (visible in FIG. 1) having an inner diameter that is slightly larger than the outer dimensions of the longitudinal ribs 24 of the tubular end piece 20 on which it is mounted so as to be able to slide. On its outer face, the guide ring 40 has a cylindrical portion 41, followed by a chamfer 42 that flares with increasing distance from the cylindrical portion 41. The chamfer 42 is disposed such that when the intermediate ring 4 is fitted onto the tubular end piece 20, the chamfer 42 extends away from the free end of the tubular end piece 20. The chamfer 42 is at least partially annular. In the example shown, the chamfer 42 has two separate concentric portions. The intermediate ring 4 further comprises two separate diametrically disposed tongues 43, which are integral to the guide ring 40. These tongues 43 are provided between the portions of the chamfer 42 and are inscribed in a cylinder of larger diameter than that of the chamfer 42. The tongues 43 are also elastically deformable. The free end of each tongue 43 is provided with a radial lug 44 whose function will be explained hereinbelow. Once the intermediate ring 4 has been fitted onto the tubular end piece 20, the tongues 43 create an annular seat 45 between the intermediate ring 4 and the tubular end piece 20. The intermediate ring 4 can slide on the tubular end piece 20 in direction A, between a frontal position in which it is close to the free end of the tubular end piece 20 and a dorsal position in which it is far from the free end of the tubular end piece 20 and close to the stepped end pieces 21.

In the example shown, the elastic biasing element 5 is a compression spring having coils whose inner diameter is slightly larger than the outer dimensions of the longitudinal ribs 24 and whose outer diameter is slightly smaller than the diameter of the annular seat 45 of the intermediate ring 4. Thus, the elastic biasing element 5 can be fitted onto the tubular end piece 20 and partially seated in the annular seat 45 of the intermediate ring 4. One end of the elastic biasing element 5 bears against the edge of the guide ring 40 of the intermediate ring 4, and the other against a radial shoulder 26 of the body 2. The elastic biasing element 5 tends to urge the intermediate ring 4 toward an initial resting position that corresponds to the frontal position.

The locking means include an elastically deformable, U-shaped locking element 6, for example formed of spring wire. The two arms or branches 60 of the U of the locking element 6 can thus be forced away from each other in a direction transverse to direction A toward an unlocked position, before being released and coming elastically back together into a locked position.

In its frontal mouth, the sleeve 7 has an inner orifice 70 whose shape and dimensions are substantially complementary to those of the intermediate ring 4. Thus, the sleeve 7 includes longitudinal slots 71 that are designed to allow the tongues 43 of the intermediate ring 4 to pass. These longitudinal slots 71 serve to guarantee the angular position of the intermediate ring 4 relative to the sleeve 7 during assembly. The distance between these longitudinal slots 71 is smaller than the distance separating the radial lugs 44. Thus, the tongues 43 must be bent toward one another in order to get past the longitudinal slots 71. In alignment with these longitudinal slots 71 and passing through the medial portion of the sleeve 7 are two radial windows 72, through which the tongues 43 are visible when the intermediate ring 4 is in its dorsal position. When the sleeve 7 has been fitted onto the tubular end piece 20, the sleeve 7 and the tubular end piece 20 define between them an annular chamber 73 in which the intermediate ring 4 seated so as to be able to slide. This annular chamber 73 is coaxial with the tubular end piece 20 and is intended to receive the end of a plug-in fluid pipe 8 that fits onto the free end of the tubular end piece 20 by axial insertion accompanied by axial pushing of the intermediate ring 4. The inner orifice 70 of the sleeve 7 further comprises inner radial recesses 74, which frontally delimit radial windows 72 and against which the radial lugs 44 of the tongues 43 of the intermediate ring 4 are to bear. The sleeve 7 further comprises two radial openings 75, which are located diametrically opposite each other and open into the inner orifice 70. The radial openings 75 are disposed angularly between the longitudinal slots 71. These radial openings 75 are intended to receive the branches 60 of the locking element 6 and are edged by radial ribs 76 (visible in FIG. 1) that guide the branches 60 of the locking element 6 between its locked and unlocked positions. Remote from the longitudinal slots 71, the sleeve 7 comprises two mutually separate, incurvate, longitudinal wings 77 (visible in FIG. 1) that prolong the inner orifice 70. These longitudinal wings 77 are in alignment with the longitudinal slots 71 and are intended to straddle the intersection between the stepped end pieces 21 of the body 2 in order to orient the sleeve 7 angularly relative to the body 2 during assembly.

The means of communication used is a fluid pipe 8 with a main orifice 80 passing through it and an outer diameter substantially equal to that of the maximum diameter of the intermediate ring 4 where the chamfer 42 is greatest. The fluid pipe 8 used is also provided with an annular neck 81—here, a circular one—which is intended to receive the branches 60 of the locking element 6. The end of the fluid pipe need not have any particular shape.

Figure 2:
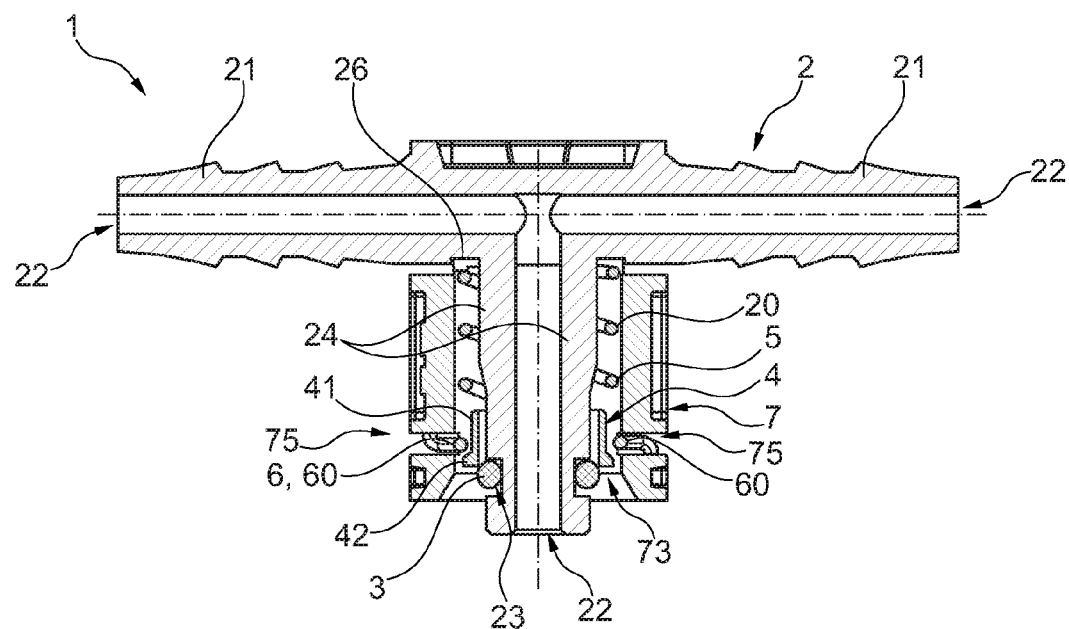
FIGS. 2 and 3, 4 and 5, 6 and 7, and 8 and 9 are axial sectional views along two axial planes, successively illustrating various steps in the assembly of the fluid communication device of FIG. 1.
Figure 3:
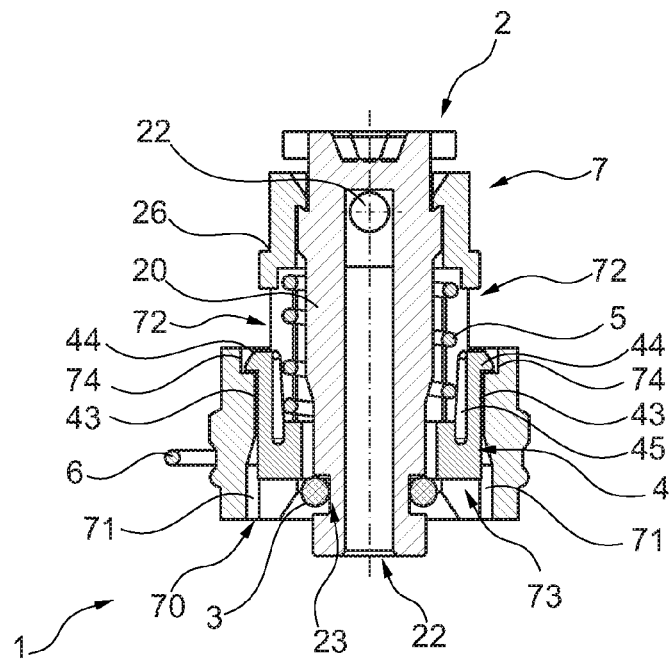

Turning now to FIGS. 2 and 3, prior to the use of the fluid communication device 1, the annular gasket 3, the elastic biasing element 5, the intermediate ring 4, the sleeve 7 and the locking element 6 are assembled on the body 2. During assembly, the elastic biasing element 5 is guided over the tubular end piece 20 by the longitudinal ribs 24 and the inclined ramps 25, facilitating insertion. To insert the intermediate ring 4 into the sleeve 7, the tongues 43 are elastically deformed toward one another to enable the radial lugs 44 to get past the longitudinal slots 71. When the radial lugs 44 are opposite the radial windows 72, the tongues 43 relax. The intermediate ring 4 is then locked in the sleeve 7 by its radial lugs 44 and the inner radial recesses 74 of the sleeve 7. In this pre-assembled state of the fluid communication device 1, the branches 60 of the locking element 6 are in locked position, projecting into the annular chamber 73 and bearing against the guide ring 40 of the intermediate ring 4. The intermediate ring 4 is held in its frontal position by the elastic biasing element 5. The angular position of the intermediate ring 4 relative to the sleeve 7 is guaranteed by the tongues 43 and the radial windows 72. In addition, the angular position of the sleeve 7 relative to the body 2 is guaranteed by the longitudinal wings 77 and the stepped end pieces 21.

Figure 4:
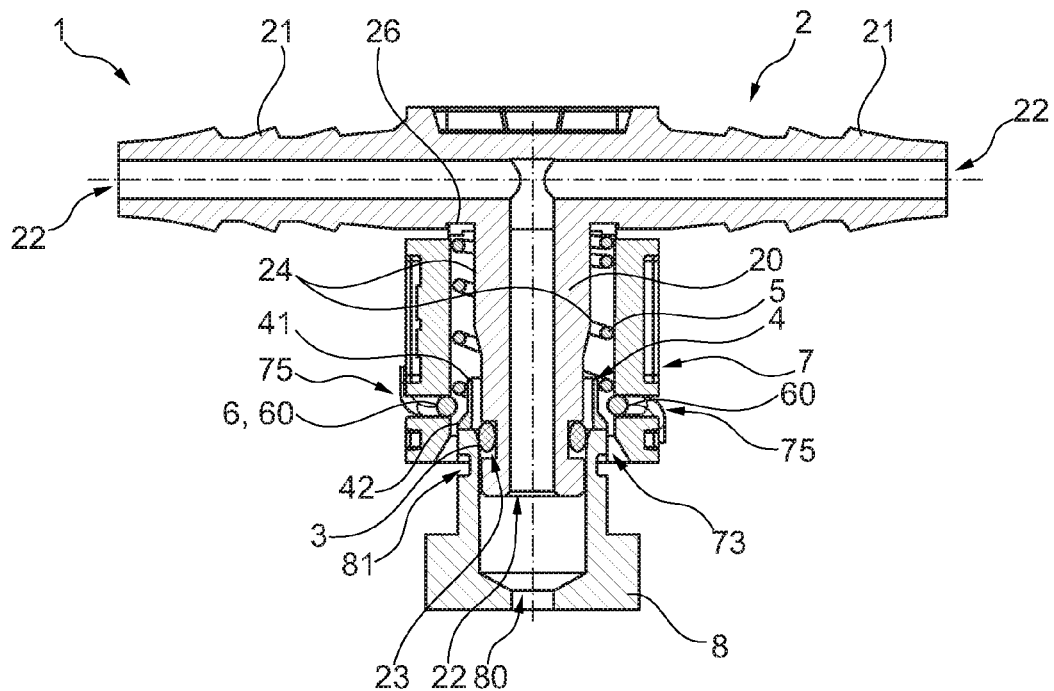
Figure 5:
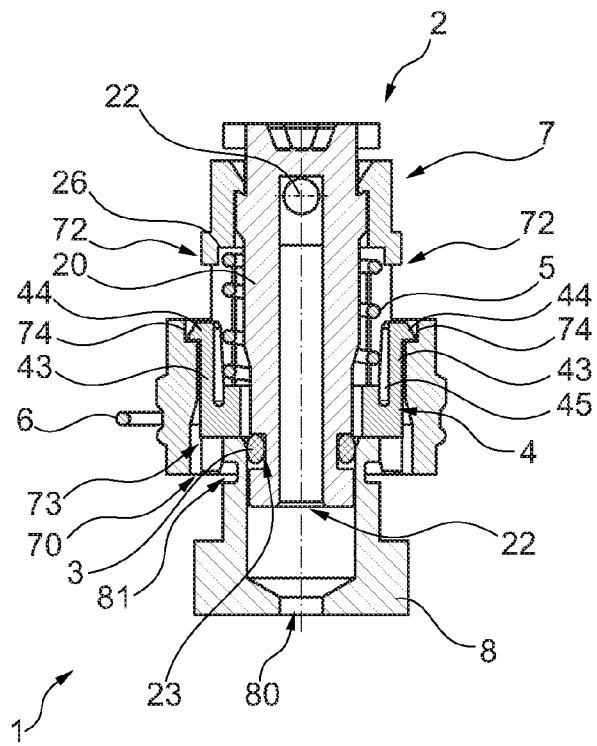
Figure 6:
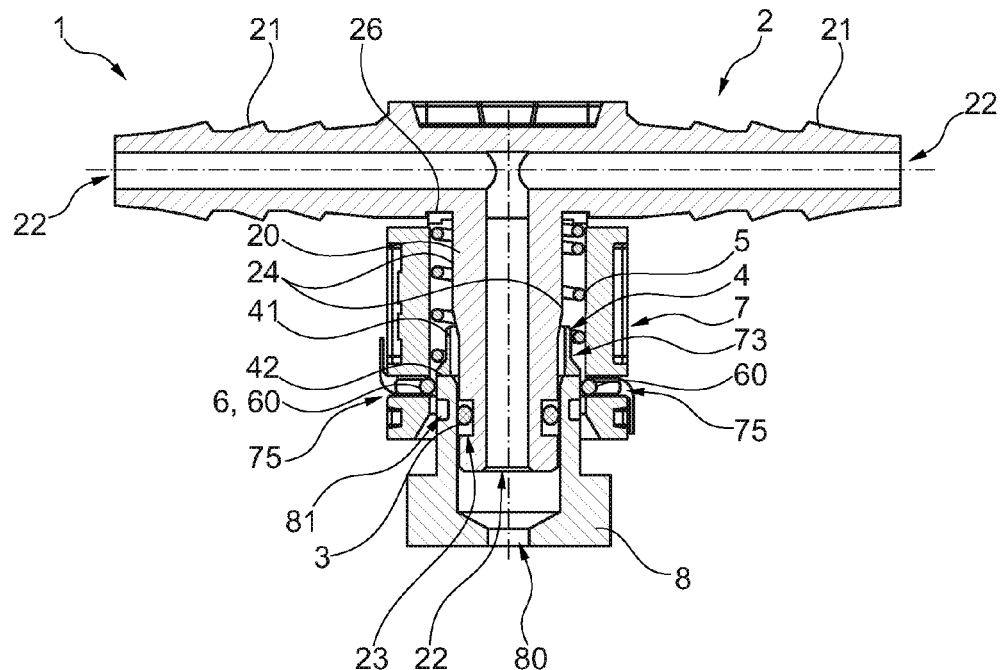
Figure 7:
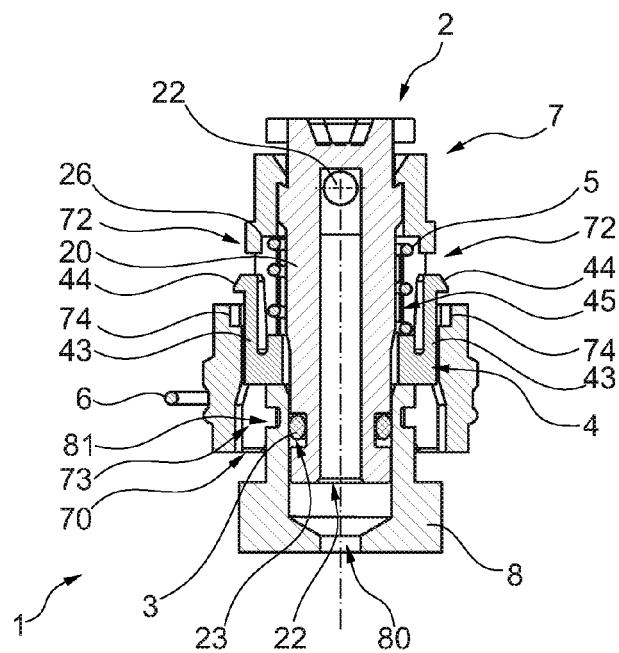
Figure 8:
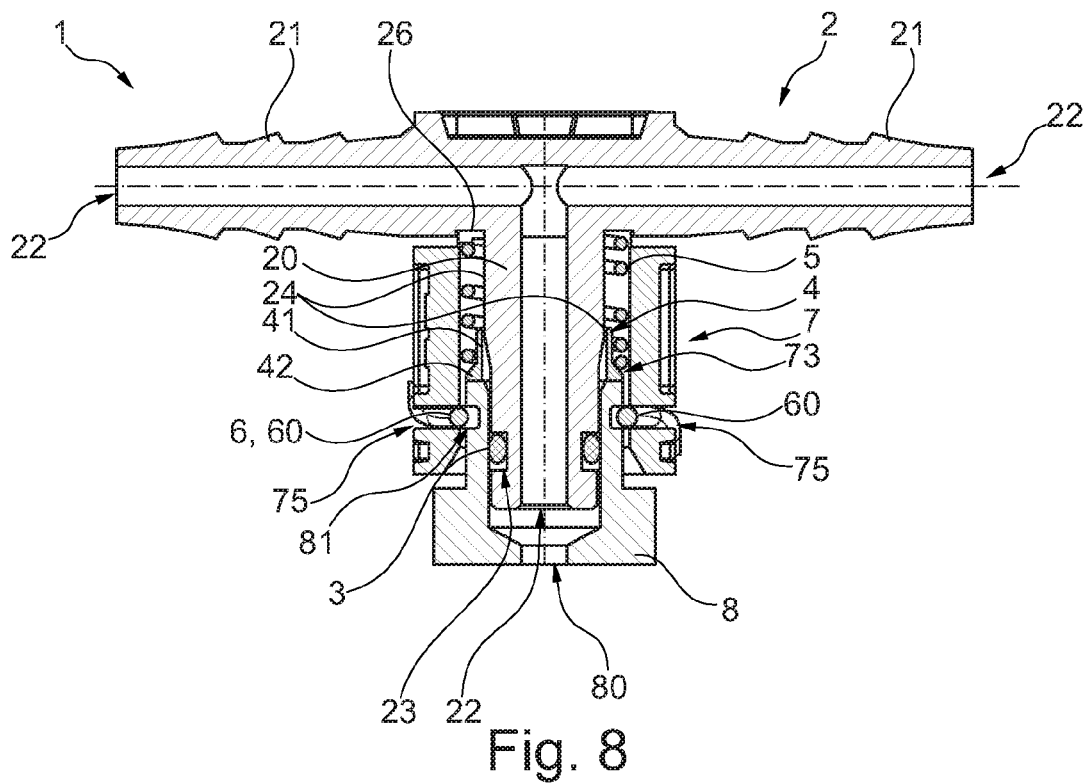
Figure 9:
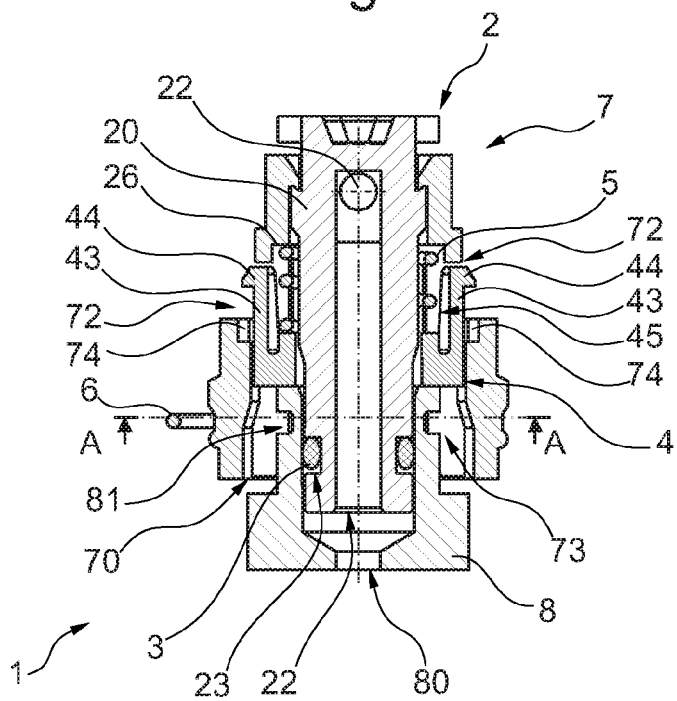
Figure 10:
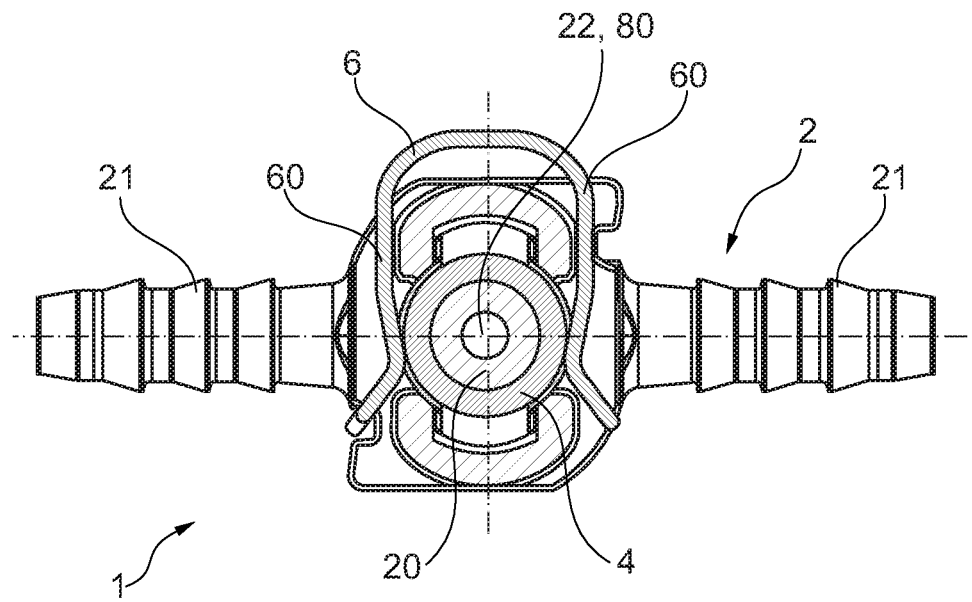
FIGS. 10 and 11 are radial sections of the fluid communication device of FIG. 1 in which the sectional plane passes through the locking element, particularly through plane AA of FIG. 9, and which illustrate the respectively unlocked and locked positions of the locking element.
Figure 11:
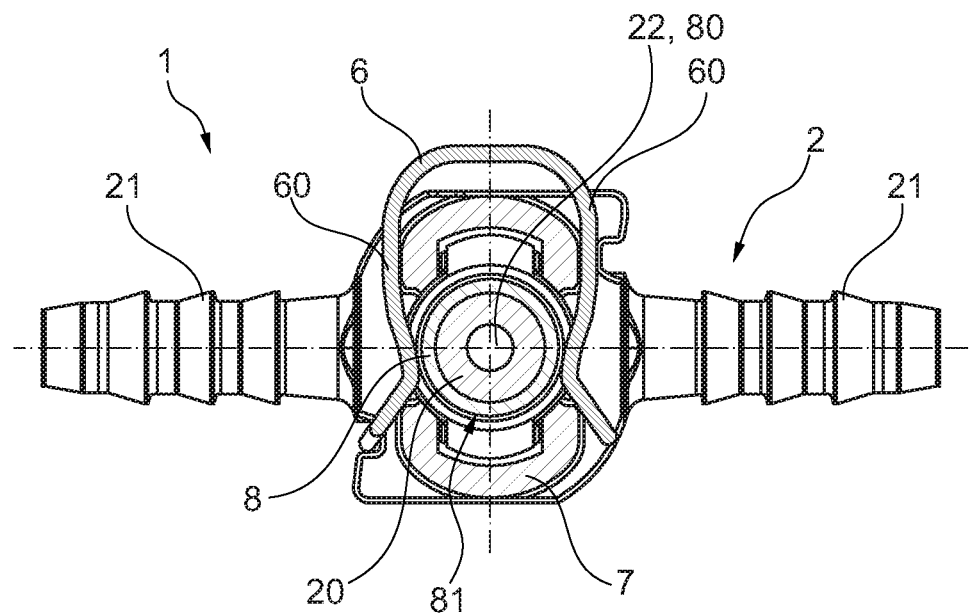

Referring now to FIGS. 4 and 5, when a fluid pipe 8 is to be fitted on, it is first positioned within the axis of the tubular end piece 20 and is then inserted axially over the tubular end piece 20 and into the inner orifice 70 of the sleeve 7. In the process, the free end of the fluid pipe 8 comes into contact with the side of the intermediate ring 4. Leaktightness between the fluid pipe 8 and the tubular end piece 20 is ensured by the annular gasket 3. Turning to FIGS. 6 and 7, the free end of the fluid pipe 8 continues to be inserted axially, which causes the intermediate ring 4 to be displaced in the annular chamber 73, the elastic biasing element 5 to be gradually compressed, and the branches 60 of the locking element 6 to slide over the guide ring 40. The locking element 6 is still in locked position at this point. The insertion of the free end of the fluid pipe 8 continues. The branches 60 of the locking element 6 that are in contact with the chamfer 42 are elastically spread apart transversely to direction A until the chamfer 42 has been cleared. As illustrated by FIG. 10, the branches 60 of the locking element 6 are then in unlocked position, in which they are separated by a distance that allows the free end of the fluid pipe 8 to pass without stress. During this step, the compression of the elastic biasing element 5 is increased. The insertion of the free end of the fluid pipe 8 proceeds further. With reference to FIGS. 8, 9 and 11, when the branches 60 of the locking element 6 are opposite the circular neck 81 of the fluid pipe 8, they relax into their locked position, in which they are seated in the circular neck 81 and prevent the fluid pipe 8 from being withdrawn from the sleeve 7 and the tubular end piece 20. The fluid pipe is then in abutment with the tubular end piece. Leaktightness between the fluid pipe 8 and the tubular end piece 20 continues to be ensured by the annular gasket 3. In this locked position, the tongues 43 of the intermediate ring 4 are visible through the radial windows 72 of the sleeve 7. Visual inspection of the positions of the tongues 43 in the radial windows 72 makes it possible to ascertain that the fluid pipe 8 is properly connected and effectively locked. The fluid pipe 8 is solidly fitted to the fluid communication device 1.

If necessary, the fluid pipe 8 can easily be removed from the fluid communication device 1 by pressing the tongues 43 toward one another so as to free the radial lugs 44 from the inner radial recesses 74. The elastic biasing element 5 can then be freed by forcibly pulling on the fluid pipe 8 to get the branches 60 of the locking element 6 to come out of the circular slot in the circular neck 81 of the fluid pipe 8. The elastic biasing element 5 acts in opposition to the axial displacement of the intermediate ring toward the tubular end piece and tends to maintain the intermediate ring 4 in its frontal initial position when the latter is not being pushed by the plug-in fluid pipe. Thus, after being removed, the fluid pipe 8 can again be connected to the fluid communication device 1 as described above.

As is clearly apparent from the foregoing description, the fluid communication device 1 according to the invention makes it possible to limit the force that must be exerted in fitting on the fluid pipe 8. This is because the intermediate ring 4, particularly with the chamfer 42, makes it easier to get the fluid pipe 8 past the locking element 6 without requiring any particular shape for the end of the fluid pipe 8. It goes without saying that the present invention is in no way limited to the foregoing description of the embodiment, which is susceptible of some modifications without thereby departing from the scope of the invention.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A fluid communication device, comprising:

a tubular body including a tubular end piece extending in an axial direction, said tubular end piece connectable by axial insertion into a plug-in pipe having an outer annular locking neck;

an assembly head, separate from said tubular body, in which said tubular end piece is received, said assembly head including a receiving chamber coaxial with said tubular end piece and adapted to receive said plug-in pipe to connect said assembly head to said tubular end piece;

a U-shaped locking element including two arms inserted into said receiving chamber along an insertion direction perpendicular to said axial direction, said two arms disposed within said receiving chamber in a pre-assembled state, said two arms elastically spreadable apart from one another in said receiving chamber along said insertion direction upon axial displacement of said plug-in pipe in said receiving chamber toward a position of abutment in which said plug-in pipe is fully connected to said tubular end piece, said two arms engaged within said annular locking neck of said plug-in pipe upon said plug-in pipe reaching said position of abutment to lock said plug-in pipe in said assembly head; and an intermediate ring mounted in said receiving chamber and slidably movable in said axial direction between a frontal position and a dorsal position to effect a pre-opening of said locking element, said intermediate ring axially spaced from said plug-in pipe and adapted to be pushed axially between said frontal and dorsal positions by contacting engagement with said plug-in pipe when said plug-in pipe is displaced in said receiving chamber toward said tubular end piece, said intermediate ring including chamfers engageable with said two arms of said locking element to spread said two arms apart from one another prior to said plug-in pipe reaching said position of abutment.

2. The device of claim 1, further comprising an elastic biasing element mounted in said receiving chamber to oppose axial displacement of said intermediate ring towards said dorsal position and return said intermediate ring to said frontal position when said intermediate ring is not being pushed by said plug-in pipe.

3. The device of claim 1, wherein said intermediate ring comprises a reference tongue visual from an outside of said assembly head when said plug-in pipe is locked on said tubular end piece.

* * * * *